(12) United States Patent
Grondin et al.

(10) Patent No.: US 11,475,645 B2
(45) Date of Patent: Oct. 18, 2022

(54) SYSTEMS AND METHODS FOR INSTALLING AN ITEM USING AUGMENTED REALITY

(71) Applicant: Verizon Patent and Licensing Inc., Basking Ridge, NJ (US)

(72) Inventors: Peter Ryan Grondin, Fairport, NY (US); Michael D. Hanson, Cumming, GA (US); Marc J. Durocher, Jr., Auburn, MA (US); Erik Sheehan, Sparta, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 73 days.

(21) Appl. No.: 17/178,043

(22) Filed: Feb. 17, 2021

(65) Prior Publication Data
US 2022/0262076 A1  Aug. 18, 2022

(51) Int. Cl.
| | | |
|---|---|---|
| G06T 19/00 | (2011.01) | |
| G06T 19/20 | (2011.01) | |
| G01S 17/08 | (2006.01) | |
| G01B 11/02 | (2006.01) | |
| G09B 19/00 | (2006.01) | |
| G09B 5/06 | (2006.01) | |
| G06K 7/14 | (2006.01) | |
| G09B 5/02 | (2006.01) | |
| G08B 5/38 | (2006.01) | |
| G08B 3/00 | (2006.01) | |

(52) U.S. Cl.
CPC .......... *G06T 19/006* (2013.01); *G01B 11/026* (2013.01); *G01S 17/08* (2013.01); *G06K 7/1413* (2013.01); *G06K 7/1417* (2013.01); *G06T 19/20* (2013.01); *G09B 5/02* (2013.01); *G09B 5/065* (2013.01); *G09B 19/003* (2013.01); *G06T 2200/24* (2013.01); *G06T 2219/008* (2013.01); *G06T 2219/2016* (2013.01); *G08B 3/00* (2013.01); *G08B 5/38* (2013.01)

(58) Field of Classification Search
None
See application file for complete search history.

(56) References Cited

U.S. PATENT DOCUMENTS

| | | | |
|---|---|---|---|
| 2018/0336732 A1* | 11/2018 | Schuster | G06T 19/006 |
| 2021/0120430 A1* | 4/2021 | Al-Mufti | H04W 16/14 |
| 2021/0378172 A1* | 12/2021 | Ackerman | G05D 1/0278 |

* cited by examiner

*Primary Examiner* — Frank S Chen

(57) ABSTRACT

In some implementations, a device may determine dimensions of an installation area in a real-world environment and may obtain information identifying dimensions of an installation template associated with installing an equipment in the real-world environment. The device may determine a scale for displaying augmented reality representations associated with installing the equipment, based on the dimensions of the installation area and the dimensions of the installation template. The device may identify, based on information identifying an installation point of the installation template, a virtual installation point associated with installing the equipment in the installation area. The user device may display an augmented reality representation of the virtual installation point to enable a depiction of a corresponding real installation point in the installation area. The augmented reality representation may be displayed based on the scale and a distance from the user device to the installation area.

20 Claims, 11 Drawing Sheets

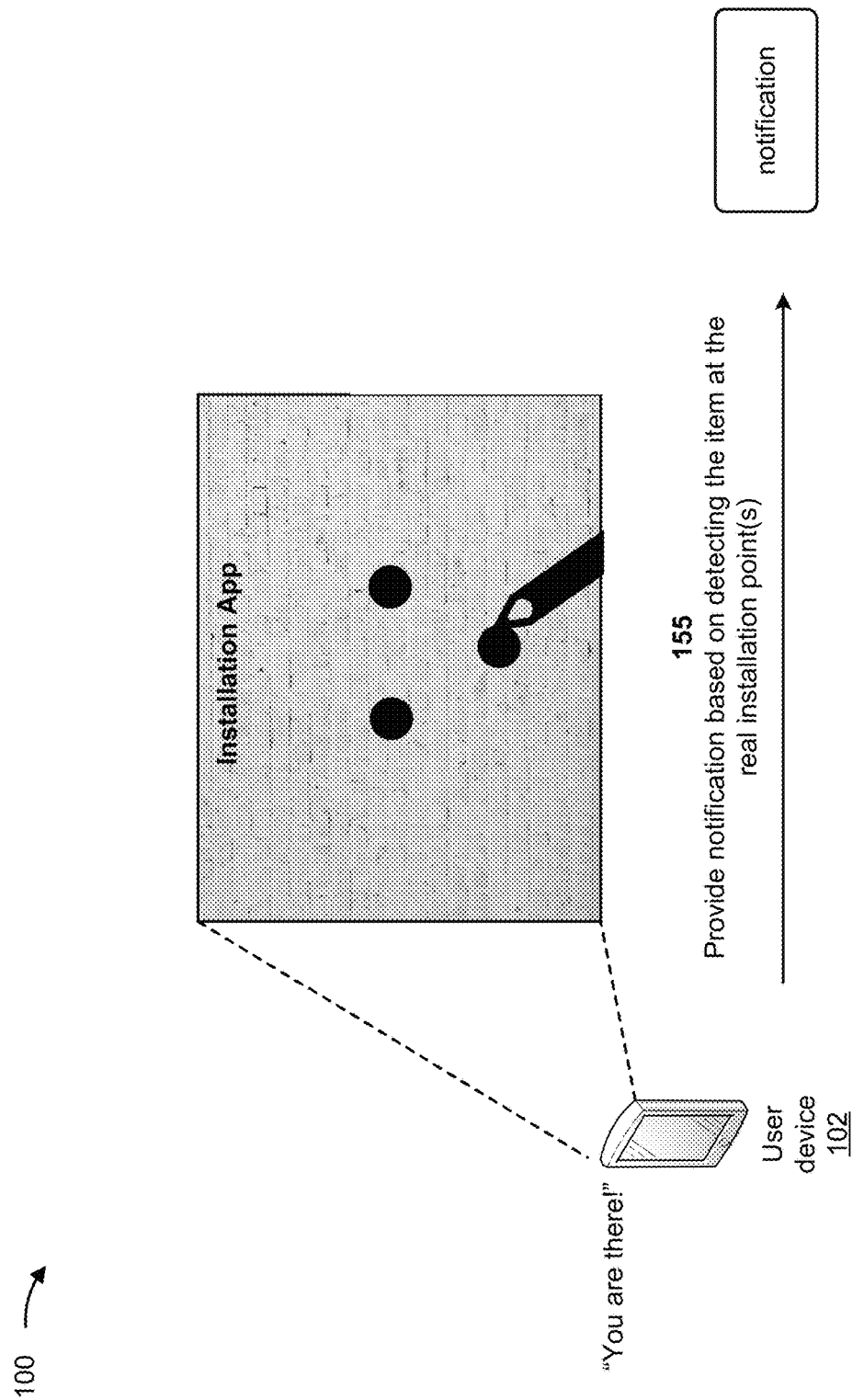

SYSTEMS AND METHODS FOR INSTALLING AN ITEM USING AUGMENTED REALITY

BACKGROUND

Extended reality (XR), such as augmented reality (AR), virtual reality (VR), and/or mixed reality (MR), may refer to computer technologies that integrate real and virtual elements to create an immersive experience. For example, AR generally refers to interactive technologies in which objects in a real-world environment are augmented with computer-generated virtual content.

BRIEF DESCRIPTION OF THE DRAWINGS

FIGS. 1A-1H are diagrams of an example associated with installing an item using augmented reality.

DETAILED DESCRIPTION OF PREFERRED EMBODIMENTS

Figure 1A:
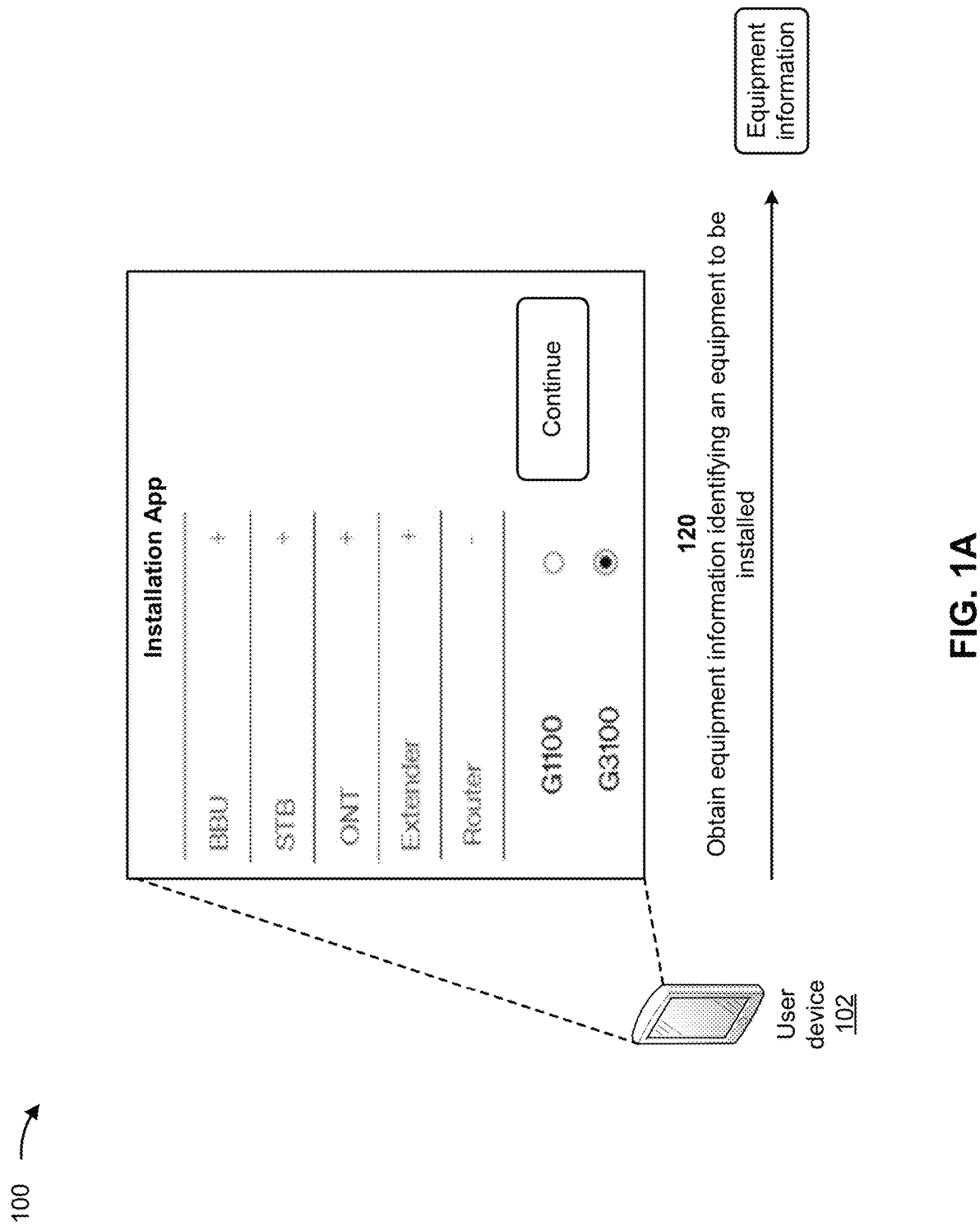

The following detailed description of example implementations refers to the accompanying drawings. The same reference numbers in different drawings may identify the same or similar elements.

In order to install an equipment, an inexperienced user may receive training or may access documentation (e.g., documents provided by equipment manufacturers, publicly available instruction/training videos, among other examples) to understand and implement the installation process. Such training may not be beneficial because the training may be peer-based and may possibly result in utilization of improper installation techniques, thereby leading to improper installation of the equipment. Relying on the documentation may also lead to improper installation of the equipment because the documentation may be outdated, may not provide adequately accurate information to complete the installation, and/or may be incorrectly interpreted by the inexperienced user.

Some implementations described herein are associated with installing an item (e.g., equipment, a bracket, an anchor point, a mounting fixture, etc.) using augmented reality. In some implementations, an equipment installation application may utilize augmented reality to identify a virtual installation point associated with installing the equipment in a real-world environment. In some aspects, the equipment installation application may enable depiction of a corresponding real installation point in the real-world environment based on displaying an augmented reality representation of the virtual installation point with respect to the real-world environment.

By using augmented reality to identify the virtual installation point and enabling depiction of the corresponding real installation point in the real-world environment, a user may be enabled to install the equipment without relying on experience, external training and/or documentation.

In some aspects, the equipment installation application may cause a device to perform actions associated with installing an equipment using augmented reality. For example, the device may identify a virtual installation point associated with installing an equipment in an installation area in a real-world environment. The virtual installation point may not be visible in the real-world environment. The device may display an augmented reality representation of the virtual installation point to enable a depiction of a corresponding real installation point in the installation area in the real-world environment. The device may detect that an item in the real-world environment is approaching the corresponding real installation point.

For example, the device may use one or more computer vision techniques to detect that the item is approaching the correspond real installation point. For instance, the device may process a depiction of the installation area (on a display of the device) using an image classification technique (e.g., a Convolutional Neural Networks (CNNs) technique, a residual neural network (ResNet) technique, a Visual Geometry Group (VGG) technique) and/or an object detection technique (e.g. a Single Shot Detector (SSD) technique, a You Only Look Once (YOLO) technique, and/or a Region-Based Fully Convolutional Networks (R-FCN) technique).

Based on processing the depiction of the installation area, the device may detect the item, detect the real installation point, and monitor a movement of the item (e.g., towards the corresponding real installation point), as explained below. The device may selectively provide a notification based on a distance between the item and the corresponding real installation point. The notification may include a visual notification (e.g., using a flash associated with a camera of the device and/or using a light associated with the device), an audible notification (e.g., using a speaker associated with the device), and/or a vibration (e.g., using a vibration device associated with the device, such as a vibration motor).

The notification may be provided according to a first rate when the distance is a first distance. The notification may be provided according to a second rate (different than the first rate) when the distance is a second distance. For example, as the item approaches the corresponding real installation point, the device may cause an audible noise to ping at an increasing rate and/or may cause the flash and/or the light to flash at an increasing rate. By displaying the augmented reality representation of the virtual installation point and providing the notification, the equipment installation application may enable the device to preserve computing resources, network resources, and other resources that would have otherwise been used to repair damaged equipment, restore interrupted network service, perform troubleshooting for improper installations, provide technical support for improper installations, among other examples.

FIGS. 1A-1H are diagrams of an example 100 associated with installing an item using augmented reality. As shown in FIGS. 1A-1H, example 100 includes a user device 102 and an installation platform 110. The user device 102 may include a mobile user device. The installation platform 110 may include one or more devices (e.g., associated with a cloud computing environment or a data center) that receives requests for installation information associated with installing different equipment and provides the installation information based on the requests. The user device 102 and the installation platform 110 are described in more detail below in connection with FIG. 2.

In the description to follow and merely as an example, assume that a user of the user device 102 desires to install an equipment in an installation area in a real-world environment. For example, assume that the user desires to install a network device (e.g., a router) on a wall (e.g., in a room). Further assume that the user has obtained (e.g., from the installation platform 110) an equipment installation application that enables users to install equipment in installation areas, in a real-world environment, using augmented reality. The user may initiate the equipment installation application on the user device 102 and use the equipment installation application to facilitate an installation of the equipment in the installation area. In some examples, the equipment installation application may include information identifying a network address of the installation platform 110, information identifying different types of equipment, information identifying different models of a type of equipment, information identifying a scale for displaying AR information on the display of the user device 102, information identifying different types of notifications (e.g., visual notifications, audible notifications, among other examples) to be provided during installation, information identifying a rate of the different types of notifications, among other examples. The user device 102 may use the network address to transmit a request, to the installation platform 110, for installation information associated with the equipment to facilitate the installation of the equipment in the installation area.

While the description refers to installing an equipment, the description is applicable to installing or mounting different items on different structures such as hanging a mounting bracket, a fixture, a painting, a frame, a television, a speaker on a wall or a ceiling, a light fixture, among other examples of mounting or installing items on a structure in a real-world environment. The installation area may include a room, a portion of the room, an area, a portion of the area, a wall, a ceiling, a floor, an interior space, an exterior space, etc. among other examples.

As shown in FIG. 1A, and by reference number 120, the user device 102 may obtain equipment information identifying an equipment to be installed. For example, assume that the user has initiated the equipment installation application on the user device 102. In some examples, the equipment installation application may instruct the user to identify a location type for the installation of the equipment. The location type may include a customer premise, a business, among other examples. In some examples, the equipment installation application may instruct the user to identify the equipment to be installed. In this regard, the equipment installation application may obtain the equipment information identifying the equipment based on input from the user device 102 operated by the user.

In some implementations, the equipment installation application may instruct the user to provide input identifying the equipment. The input identifying the equipment may include a selectable input, a textual input, a vocal input, an optical input, a bar code, a QR code, among other examples. In some examples, the equipment installation application may provide, via a display of the user device 102, a selectable menu (e.g., a collapsible menu, a dropdown menu, a set of radio buttons, among other examples) that provides information identifying a plurality of equipment. The equipment installation application may instruct the user to select input identifying the equipment from the information identifying the plurality of equipment. In some examples, the equipment installation application may provide, via the display, a text box and may instruct the user to input, via the text box, a textual input identifying the equipment. In some examples, the equipment installation application may instruct the user to provide, via a microphone associated with the user device 102, a vocal input identifying the equipment.

The input identifying the equipment (e.g., the selected input, the textual input, and/or the vocal input) may include information identifying a manufacturer of the equipment, information identifying a model number of the equipment, information identifying a serial number of the equipment, among other examples of information that may identify the equipment. In some implementations, the user may perform an action after selecting or providing the input identifying the equipment to cause the equipment installation application to receive such input. For example, the user may select a "Continue" button (as shown in FIG. 1A), a search button, a submit button, among other examples.

Additionally, or alternatively, to instructing the user to provide the input identifying the equipment, the equipment installation application may instruct the user to use a camera device of the user device 102 to obtain an image of the equipment (e.g., an image of the equipment in the real-world environment or an image of a depiction of the equipment). Additionally, or alternatively, the equipment installation application may instruct the user to use the camera device to obtain an image of a packaging of the equipment (e.g., a packaging in which the equipment was shipped from a location associated with the manufacturer of the equipment). Additionally, or alternatively, the equipment installation application may instruct the user to use the camera device to scan a code provided on the equipment (e.g., a Quick Response (QR) code, a matrix barcode, a one-dimensional barcode, a model number, a serial number, among other examples). Additionally, or alternatively, the equipment installation application may instruct the user to use the camera device to scan a code provided on the equipment (e.g., a QR code, a matrix barcode, a one-dimensional barcode, the model number, the serial number, among other examples).

Based on the foregoing, the equipment information may include the input identifying the equipment, image data of the image of the equipment, image data of the image of the packaging of the equipment, image data of the image of the code provided on the equipment, and/or image data of the image of the code provided on the packaging of the equipment.

In some examples, as shown in FIG. 1A, the equipment installation application may provide, via the display, a combination of a collapsible menu and a set of radio buttons that provide information identifying a plurality of equipment. Assume that the user selects (via a radio button) information identifying the network device and selects the "Continue" button. The equipment installation application may cause the user device 102 to transmit a request for installation information associated with installing the equipment, as explained below.

Figure 1B:
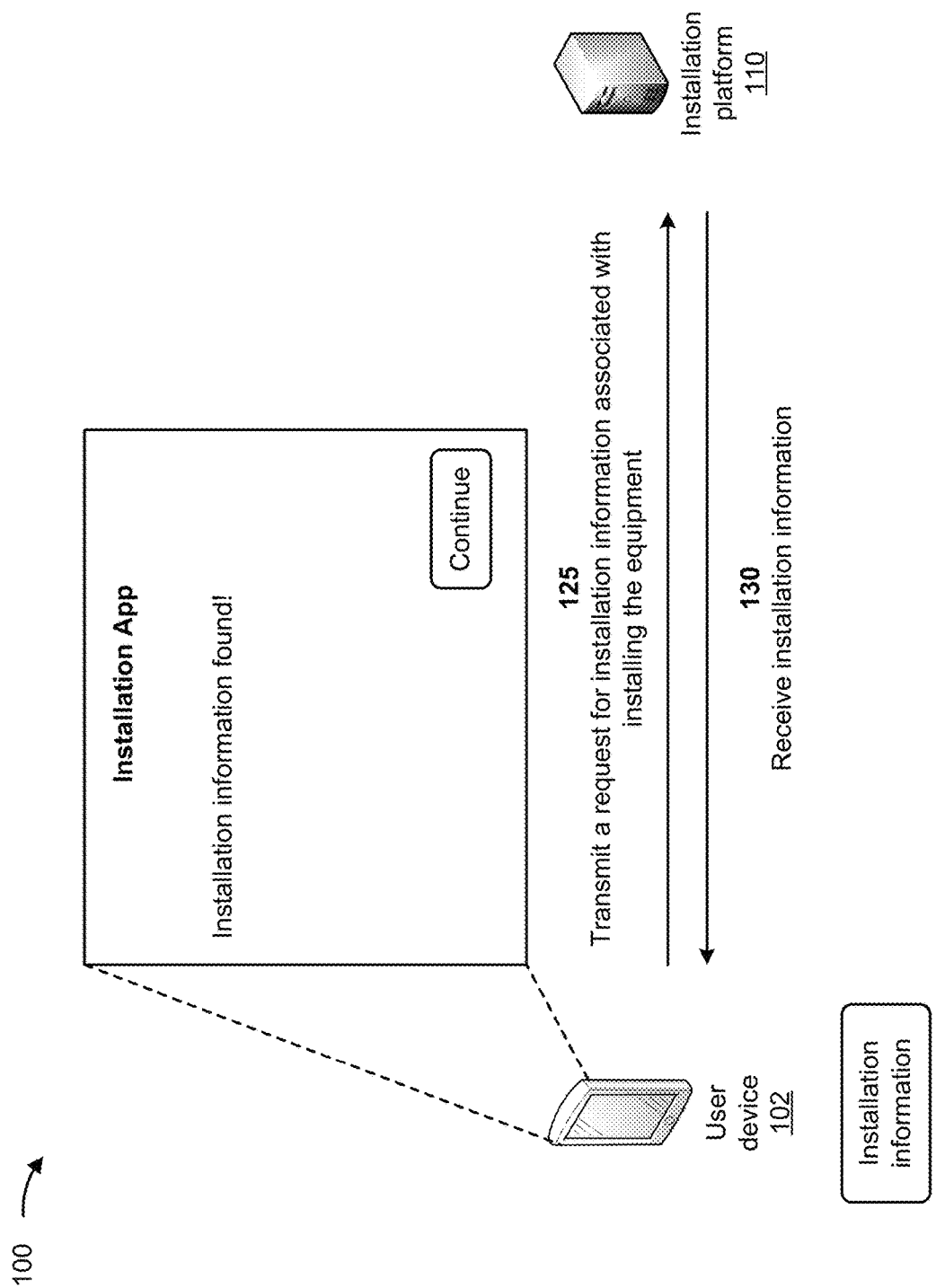

As shown in FIG. 1B, and by reference number 125, the user device 102 may transmit a request for installation information associated with installing the equipment. For example, based on obtaining the equipment information, the equipment installation application may cause the user device 102 to transmit the request to the installation platform 110 (e.g., transmit the request to the network address associated with the installation platform 110). The request may include the equipment information (as described above) and/or include a network address associated with the user device 102.

In some implementations, the equipment installation application may cause the user device 102 to transmit the request to the installation platform 110 based on receiving the input identifying the equipment, as described above. In some implementations, the equipment installation application may cause the user device 102 to transmit the request to the installation platform 110 based on the user device 102 obtaining the image of the equipment, obtaining the image of the packaging of the equipment, scanning the code provided on the equipment, and/or scanning the code provided on the packaging of the equipment. In other words, obtaining the image of the equipment, obtaining the image of the packaging of the equipment, scanning the code provided on the equipment, and/or scanning the code provided on the packaging of the equipment may be a trigger to cause the user device 102 to transmit the request to the installation platform 110.

The installation platform 110 may receive the request and use the equipment information (included in the request) to identify the installation information associated with installing the equipment. In some implementations, the installation platform 110 may identify the installation information in a data structure associated with the installation platform 110. The data structure (e.g., a database, a table, and/or a linked list) may store installation information for different equipment. For example, the data structure may store first installation information associated with a first equipment, second installation information associated with a second equipment, and so on. In practice, the data structure may store installation information for hundreds of thousands of equipment.

In some examples, the installation platform 110 may perform a look-up of the data structure using the equipment information in order to identify the installation information associated with the equipment. For example, the installation platform 110 may perform a look-up of the data structure using the selected input, the textual input, and/or the vocal input described above. With respect to the vocal input, the installation platform 110 may convert the vocal input into textual input and may perform the look-up using the converted textual input.

In some implementations, the installation platform 110 may use an object detection technique to process the image data of the equipment, the image data of the packaging of the equipment, the image data of the code provided on the equipment, and/or the image data of the code provided on the packaging to identify the equipment. For example, the installation platform 110 may use a deep learning technique (e.g., a faster regional convolutional neural networks (R-CNN) technique, a you only look once (YOLO) technique, a single shot detectors technique, among other examples), a computer vision technique (e.g., an open source computer vision (OpenCV) technique), among other examples to identify the equipment. The installation platform 110 may perform a look-up of the data structure based on a result of using the object detection technique to identify the equipment (e.g., information regarding the equipment).

Based on performing the look-up of the data structure, the installation platform 110 may identify the installation information associated with the equipment information. In some implementations, the installation information may include information identifying a template for installing the equipment (e.g., a mounting template), installation instructions (e.g., step-by-step instructions for installing the equipment), a training video associated with installing the equipment (e.g., to identify processes and procedures for proper installation and safety related information), three dimensional (3D) data to render a 3D graphical representation of the equipment, manufacturer drawings (e.g., engineering drawings) of the equipment, dimensions of the equipment, wiring information (e.g., wiring schematics) associated with any wiring of the equipment as part of installing the equipment, technical documents associated with installing the equipment, and/or installation recommendations associated with installing the equipment (e.g., recommendations regarding tools, recommendations regarding personal protective equipment, among other examples). In some examples, the information identifying the template may identify one or more installation points (e.g., one or more mounting points) and identify a configuration of the one or more installation points (e.g., a quantity of the one or more installation points, a size of the one or more installation points, a distance between the one or more installation points, a spatial arrangement of the one or more installation points, among other examples).

In some implementations, the installation platform 110 may be unable to identify particular installation information associated with installing a particular equipment. In such instance, the installation platform 110 may transmit to the user device 102 an indication that the particular installation information was not identified. The indication may cause the equipment installation application to instruct the user for information regarding the particular equipment. For example, the equipment installation application may instruct the user to use the camera of the user device 102 to obtain images of the particular equipment that may be used to generate a 3D graphical representation of the particular equipment. The images of the particular equipment may identify installation points on the particular equipment (e.g., brackets, holes, among other examples). Additionally, or alternatively, to obtaining the images of the particular equipment, the equipment installation application may instruct the user to use the camera of the user device 102 to obtain images of a particular installation template associated with installing the particular equipment. The images of the particular installation template may identify particular installation points of the installation template, a spatial configuration of the particular installation points, a quantity of the particular installation points, among other examples.

Additionally, or alternatively, to obtaining the images of the particular equipment, the equipment installation application may instruct the user to provide dimensions of the particular equipment, dimensions of the particular installation points on the particular equipment, distances between the particular installation points on the particular equipment, dimensions of the particular installation points of the installation template, and/or distances between the particular installation points of the installation template. Additionally, or alternatively, the equipment installation application may instruct the user to provide images of schematics of the particular equipment, provide installation insights associated with installing the particular equipment, identify documents (e.g., links to technical documents) associated with installing the particular equipment, identify training materials (e.g., links to training videos) associated with installing the particular equipment to identify processes and procedures for proper installation and safety related information.

The equipment installation application may cause the user device 102 to transmit the information regarding the particular equipment and information identifying the particular equipment to the installation platform 110 for storage in the data structure. The information identifying the particular equipment may include information identifying a manufacturer of the particular equipment, information identifying a model number of the particular equipment, information identifying a serial number of the particular equipment, among other examples. In some implementations, the installation platform 110 may transmit, to a device associated with the manufacturer of the particular equipment, a request for the information regarding the particular equipment. The installation platform 110 may receive the information regarding the particular equipment from the device associated with the manufacturer and may store the information regarding the particular equipment, in a manner similar to the manner above.

As shown in FIG. 1B, assume that the installation platform 110 has identified the installation information associated with installing the equipment. The installation platform 110 may transmit the installation information to the user device 102. For example, the installation platform 110 may transmit the installation information to the network address associated with the user device 102 (e.g., the network address included in the request transmitted by the user device 102).

As shown in FIG. 1B, and by reference number 130, the user device 102 may receive the installation information. For example, the user device 102 may receive the installation information transmitted by the installation platform 110.

Figure 1C:
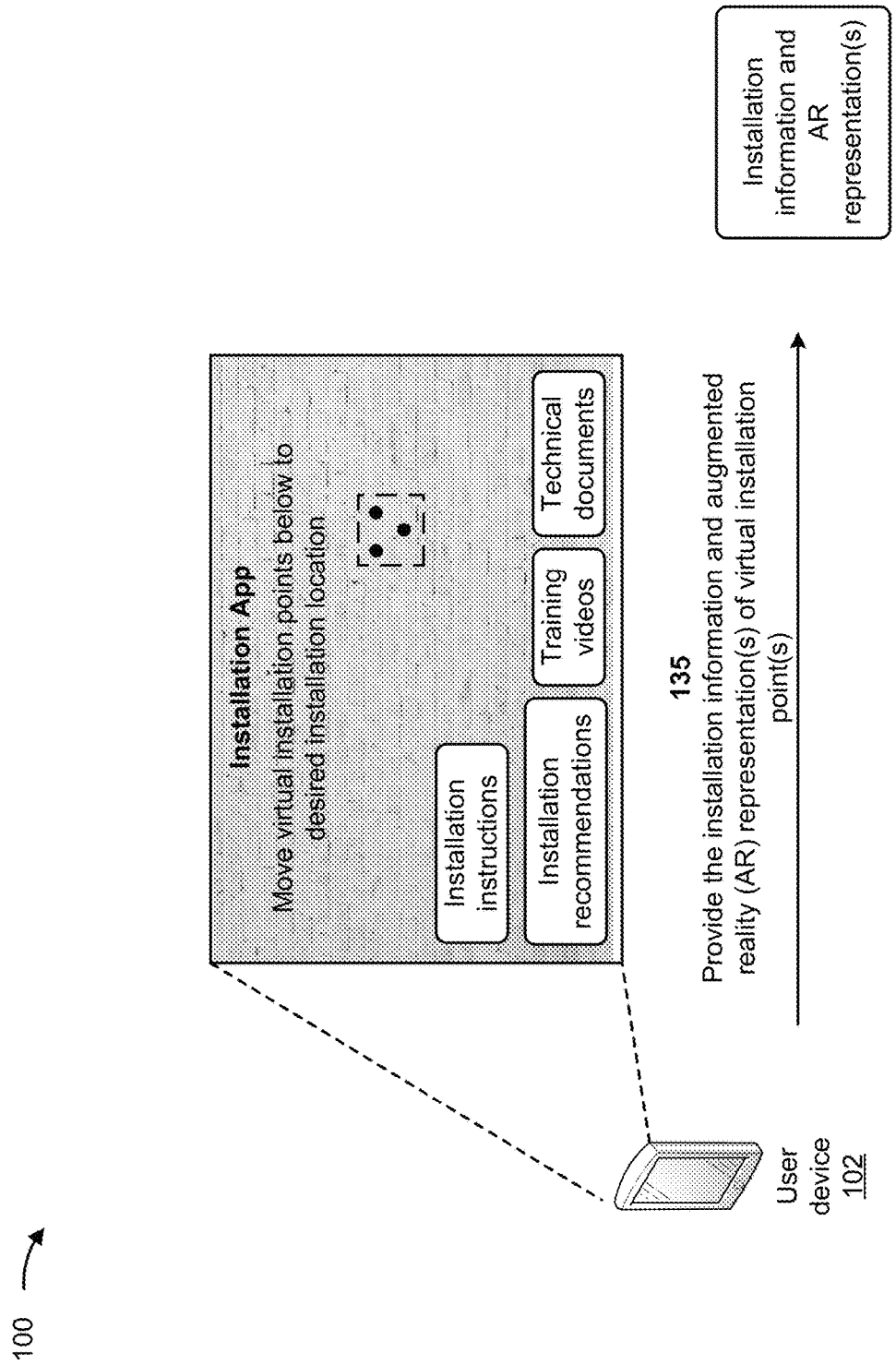

As shown in FIG. 1C, and by reference number 135, the user device 102 may provide the installation information and augmented reality (AR) representation(s) of virtual installation point(s). For example, based on the user device 102 receiving the installation information, the equipment installation application may cause the display of the user device 102 to display the installation information. In some implementations, the equipment installation application may cause the display to display an option to present the installation instructions associated with installing the equipment, an option to present the training video associated with installing the equipment, an option to present the wiring information associated with installing the equipment, an option to present the technical documents associated with installing the equipment, an option to present the installation recommendations associated with installing the equipment, among other examples.

In some implementations, receiving the installation information may cause the equipment installation application to activate an AR feature of the user device 102. The AR feature may enable the user device 102 to display AR information on the display. In some implementations, the equipment installation application may determine a scale for displaying the AR information on the display of the user device 102. In some examples, the equipment installation application may be pre-configured with the information identifying the scale for displaying AR information. For example, the equipment installation application may be pre-configured with a scale factor for displaying the AR information on the display of the user device 102. Additionally, or alternatively, the equipment installation application may determine the scale factor (for displaying the AR information) based on a size of a plane associated with the AR information (e.g., dimensions of the installation area) and a size of the installation template (e.g., dimensions of the installation template). For example, the equipment installation application may determine the scale factor as:

$$S_F = S_P / S_{IP}$$

where $S_F$ s the scale factor, $S_P$ is the size of the plane, and $S_{IP}$ is the size of the installation template.

For example, the equipment installation application may determine the scale factor by dividing a length of the installation area by a length of the installation template and/or dividing a width of the installation area by a width of the installation template. In some implementations, the dimensions of the installation template may identify the size of the one or more installation points, the distance between the one or more installation points, the spatial arrangement of the one or more installation points, among other examples. In some implementations, the equipment installation application may determine the size of the plane (e.g., dimensions of the installation area) by instructing the user to use the camera to capture the installation area in a camera view of the user device 102 and/or scan the installation area. The equipment installation application may determine the dimensions of the installation area based on data obtained by one or more sensors devices of the user device 102 when the installation area is in the camera view and/or when the installation area is being scanned.

The one or more sensor devices may include one or more time-of-flight (ToF) sensor devices, Light Detection and Ranging (LIDAR) devices, among other examples. The data obtained by the one or more sensor devices (e.g., ToF data and/or LIDAR data) may indicate a height of the installation area, a width of the installation area, a distance from the installation area (e.g., a distance from the surface of the installation area), among other examples. As an example, the equipment installation application may perform ToF calculations (associated with light transmitted by the user device 102 and reflected from the installation area) to determine the height of the installation area, the width of the installation area, the distance from the surface of the installation area, among other examples.

Additionally, or alternatively, to using the data obtained by one or more sensors devices, the equipment installation application may determine dimensions of the installation area based on input from the user of the user device 102. For example, the user may provide the dimensions of the installation area via an input interface of the user device 102. The equipment installation application may determine the size of the installation template based on the installation information. For example, the installation information may include information identifying the size of the installation template (e.g., the height of the installation template and/or the width of the installation template).

In some implementations, when determining the scale for displaying the AR information (e.g., the scale factor), the equipment installation application may determine a distance between the installation area and the user device 102 (e.g., the distance between the installation area and a position of the user device 102 when the equipment installation application is determining the scale for displaying AR information). By determining the distance between the installation area and the user device 102, the equipment installation application may cause a size of the AR information, displayed on by the user device 102, to be adjusted as the distance is adjusted when the user device 102 is moved to different positions. In some examples, the equipment installation application may determine the distance between the installation area and the user device 102 based on data from the one or more sensor devices of the user device 102 (discussed above). For example, the equipment installation application may determine the distance based on ToF data from the ToF sensor devices.

For instance, the equipment installation application may determine the distance based on ToF calculations (associated with light transmitted by the user device 102 and reflected from the installation area). As an example, the equipment installation application may determine the distance as:

$$D = c * t / 2$$

where D is the distance, c is the speed of light, and t is the travel time of light.

Additionally, or alternatively, the equipment installation application may determine the distance based on LIDAR data (associated with light transmitted by the user device 102 and reflected from the installation area). Additionally, or alternatively, the equipment installation application may determine the distance based on depth data from a depth map. In some examples, the equipment installation application may cause the camera of the user device 102 to obtain images of the installation area and may generate the depth map based on the images. The depth data may indicate a depth of the installation area with respect to the user device 102.

As an example, assume the position of the user device 102 (when the equipment installation application is determining the scale for displaying AR information) is (0, 0, 0) (e.g., 3D coordinates of a 3D space associated with the user device 102). Assume the user (with the user device 102) takes a step backward one meter in the real-world environment and that the position of the user device 102 is now (0, 0, −1). Assume that the scaling factor is 5. The position of the user device 102 will be (0, 0, −5). In this regard, the AR information may appear to be 5 times farther away from the user device 102. Accordingly, the AR information, displayed by the user device 102, may appear to be five times smaller than the AR information displayed by the user device 102 when the user device 102 is at the position of the user device 102 when the equipment installation application is determining the scale for displaying AR information.

In some implementations, the equipment installation application may determine a size of an object in the real-world environment (in addition, or in the alternatively, to determining the size of the plane). For example, the equipment installation application may instruct the user to use the camera to obtain an image of the object (e.g., located in a vicinity of the installation area). The equipment installation application may determine the size of the object in a manner similar to the manner described above (e.g., based on data obtained from the one or more sensor devices and/or based input from the user via the user device 102).

Assume that the equipment installation application has determined the scale for displaying the AR information on the display of the user device 102, as described above. The equipment installation application may analyze information identifying the configuration of the one or more installation points (e.g., the quantity of the one or more installation points, the size of the one or more installation points, the distance between the one or more installation points, the spatial arrangement of the one or more installation points, among other examples). The equipment installation application may use the information identifying the configuration of the one or more installation points and information identifying the scale (for presenting the AR information) to generate AR representations of virtual installation points corresponding to the installation points identified by the installation template and to cause the display to display the AR representations (e.g., based on the scale for presenting the AR information).

In some examples, a quantity of the AR representations may correspond to the quantity of the one or more installation points identified in the installation information, a size of the AR representations may correspond to the size of the one or more installation points identified in the installation information, a distance between the AR representations may correspond to the distance between the one or more installation points identified in the installation information, a spatial arrangement of the AR representations may correspond to the spatial arrangement of the one or more installation points identified in the installation information, and so on.

The size of the AR representations and the distance of the AR representations may be scaled based on the scale for presenting the AR information. The equipment installation application may cause the display to display the AR representations of the virtual installation points to simulate a projection of the installation points (of the template) onto the installation area. For example, the equipment installation application may cause the AR representations to be overlaid on the display. The AR representations and the virtual installation points may not be visible in the real-world environment.

In some implementations, the equipment installation application may use the 3D rendering data (included in the installation information) to render the 3D graphical representation of the equipment. In some examples, the equipment installation application may provide an option (e.g., on the display) to display the 3D graphical representation of the equipment with the AR representations of the virtual installation points. Selection of the option may cause the equipment installation application to cause the 3D graphical representation of the equipment to be displayed on the display with the AR representations of the virtual installation points. For example, the 3D graphical representation of the equipment may be overlaid over the AR representations of the virtual installation points to match the virtual installation points with a location of corresponding installation points on the 3D graphical representation of the equipment. In some instances, the equipment installation application may adjust a measure of transparency of the 3D graphical representation to enable the AR representations to be visible through the 3D graphical representation. In some examples, the equipment installation application may provide an option (e.g., on the display) to display the 3D graphical representation of the equipment without the AR representations of the virtual installation points.

As shown in FIG. 1C, for example, the equipment installation application may cause the display to display the AR representations of the virtual installation points in association with the option to present the installation instructions, the option to present the installation recommendations, the option to present the training video, and the option to present the technical documents. The number of the AR representations of the virtual installation points and the number of options displayed is merely provided as an example. In practice, a different number of the AR representations of the virtual installation points (in a different spatial arrangement) and a different number of options may be applicable to the present disclosure.

Figure 1D:
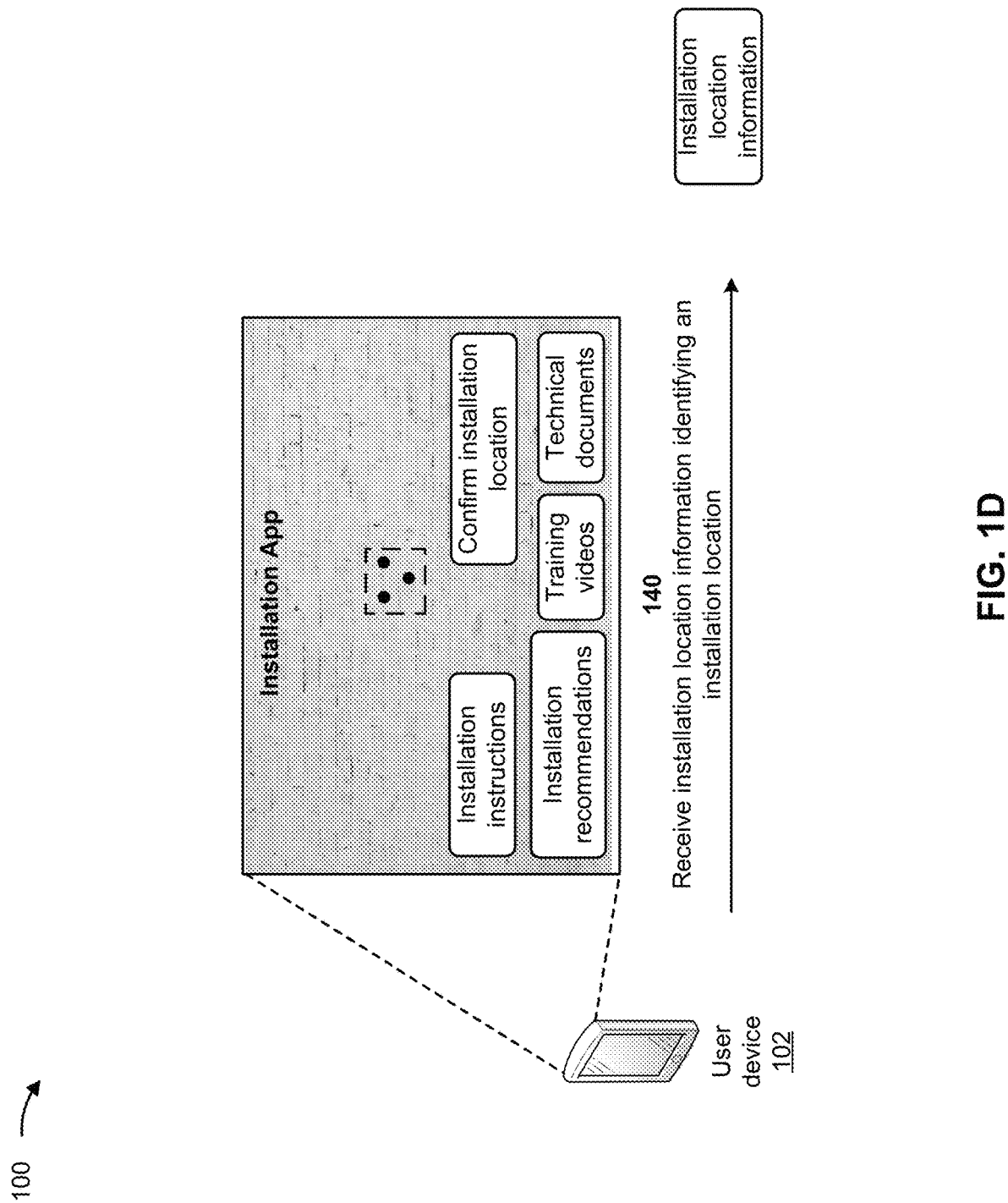

As shown in FIG. 1D, and by reference number 140, the user device 102 may receive installation location information identifying an installation location. For example, the equipment installation application may instruct the user to use the user device 102 to identify an installation location (in the installation area) desired by the user. In some implementations, the equipment installation application may instruct the user to direct the camera to the installation location and interact with the display to confirm the installation location. As the camera is directed to different possible installation locations, in the installation area in the real-world environment, the AR representations of the virtual installation points may be moved accordingly (e.g., moved to corresponding different locations on the display).

In some implementations, the user may direct to the camera to a general vicinity of the installation location and provide input identifying the installation location (e.g., textual input and/or vocal input). For example, the input may include information identifying a location relative to the dimensions of the installation area (e.g., "four feet from the left side of the wall and three feet from the bottom of the wall"). In some implementations, the user may direct to the camera to a general vicinity of the installation location and may interact with the display to identify the installation location. For example, the user may tap the display at the installation location displayed by the display.

In some implementations, the equipment installation application may cause the display to display an option to confirm the installation location. Assume that the user has identified the installation location and that the user has directed the camera to the installation location. Further assume that the display displays the AR representations of the virtual installation points at the installation location, that the user has tapped the display at the installation location displayed by the display, and that the user selects the option to confirm the installation location. Based on selection of the option to confirm the installation location, the equipment installation application may receive the installation location information identifying the installation location in the installation area in the real-world environment.

Figure 1E:
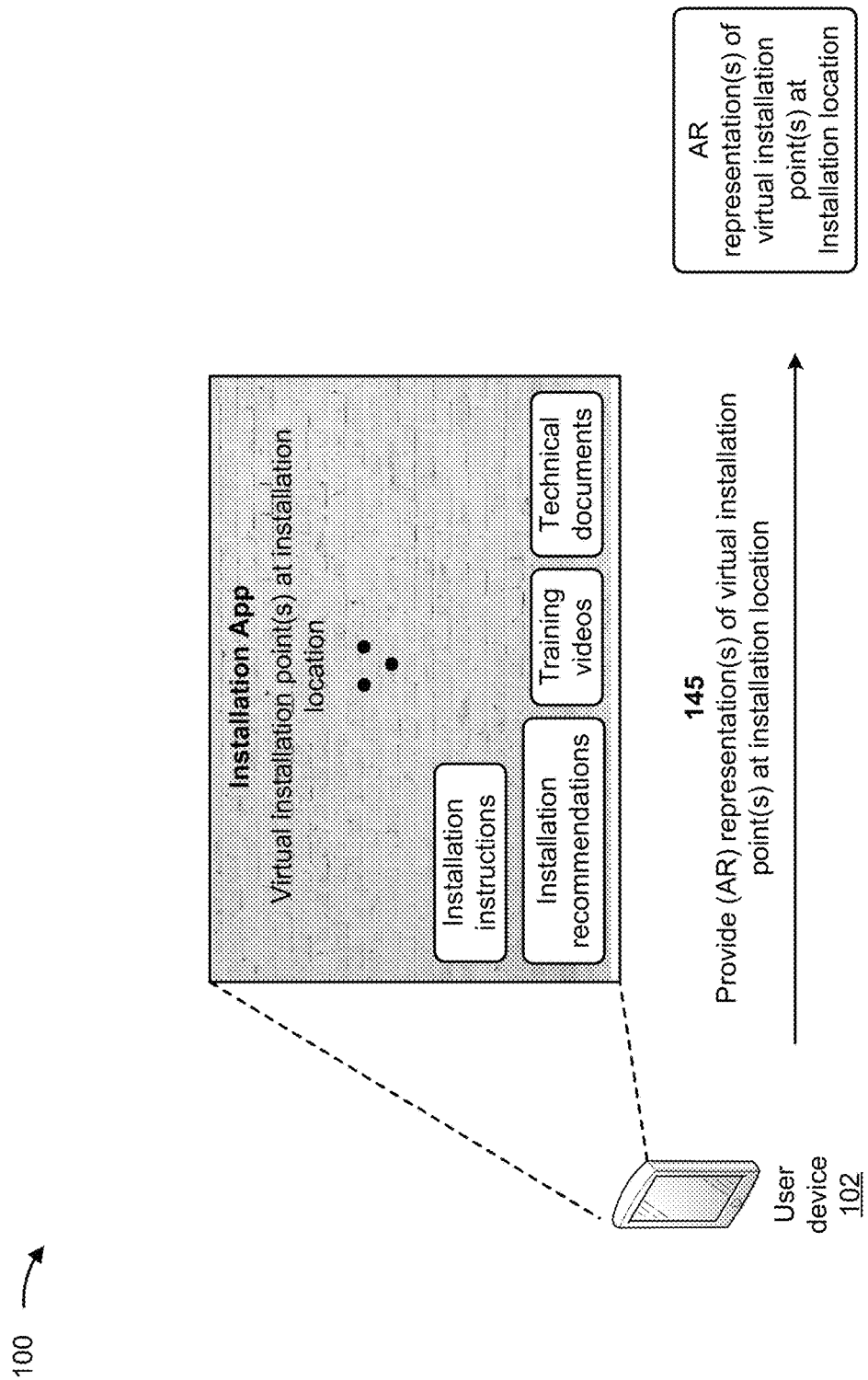

As shown in FIG. 1E, and by reference number 145, the user device 102 may provide the AR representation(s) of virtual installation point(s) at the installation location (displayed on the display). For example, based on receiving the installation location information, the equipment installation application may cause the display to display the AR representations of the virtual installation points at a virtual installation location corresponding to the installation location when the display displays the installation location in the real-world environment.

In some implementations, the equipment installation application may instruct the user to ensure that the AR representations of the virtual installation points are leveled. In some examples, the user may adjust an orientation and/or a position of the user device 102 to cause the AR representations to be leveled. In some examples, the equipment installation application may use the one or more computer vision techniques to identify a plane associated with the AR representations and a plane associated with the installation area (e.g., based on the user previously identifying the installation area). The equipment installation application may use the one or more computer vision techniques to compare the plane associated with the AR representations and the plane associated with the installation area to determine whether the planes are parallel. The equipment installation application may cause the user device 102 to provide audible notifications and/or visual notifications instructing the user regarding a manner in which the user is to manually adjust the orientation and/or the position of the user device 102 until the planes are parallel. The equipment installation application may cause the user device 102 to provide an audible notification and/or a visual notification indicating that the AR representations of the virtual installation points are leveled when the planes are parallel.

Assume that the orientation and/or the position of the user device 102 has been adjusted to cause the AR representations to be leveled. In some implementations, the equipment installation application may cause the user device 102 (e.g., using the AR feature of the user device 102) to determine AR anchors associated with displaying the AR representations of the virtual installation points at the virtual installation location (corresponding to the installation location). The AR anchors may be determined based on the installation location information. The equipment installation application may cause the user device 102 to determine the AR anchors to enable the AR representations to remain fixed at the virtual installation location (corresponding to the installation location) when the installation location is displayed on the screen. For example, the AR anchors may cause the AR representations of the virtual installation points to remain fixed at the installation location, displayed on the display, independent of a change of pose of the user device 102 (e.g., independent of a change of orientation and/or a change of position of the user device 102).

In some examples, the equipment installation application may detect the change of pose of the user device 102 (e.g., based on geospatial data of the user device 102, data from a gyroscope of the user device 102, data from an accelerometer of the user device 102, among other examples) as the user device 102 (e.g., based on operation of the user) moves toward to the installation location, moves away from the installation location, changes direction with respect to the installation location, and/or changes orientation. For example, the equipment installation application may compare first geospatial data of the user device 102 at a first time period and second geospatial data of the user device 102 at a second time period. The equipment installation application may detect the change of pose of the user device 102 (e.g., a change of an orientation and/or a position of the user device 102) based on a change between the first geospatial data and the second geospatial data. Additionally, or alternatively, the equipment installation application may compare first data from the gyroscope at a first time period and second data from the gyroscope at a second time period. The equipment installation application may detect the change of pose of the user device 102 based on a change between the first data from the gyroscope and the second data from the gyroscope. Additionally, or alternatively, the equipment installation application may compare first data from the accelerometer at a first time period and second data from the accelerometer at a second time period. The equipment installation application may detect the change of pose of the user device 102 based on a change between the first data from the accelerometer and the second data from the accelerometer. The AR anchors may cause the AR representations of the virtual installation points to be virtually anchored to the installation location displayed on the display independent of the change of pose of the user device 102.

The equipment installation application may cause the AR feature to determine the AR anchors using one or more techniques for determining AR anchors. For example, the AR feature may determine the AR anchors based on one or more objects (e.g., a location of the one or more objects) in or within a vicinity of the installation area in the real-world environment, based on one or more planes in the installation area, among other examples. In some examples, the one or more objects (e.g., the location of the one or more objects) and/or the one or more planes may be identified based on scanning the installation area, as described above.

Assume, after the AR representations of the virtual installation points are displayed in accordance with the AR anchors, that the user desires to identify, in the installation location in the real-world environment, real installation points corresponding to the virtual installation points. For example, assume that the user desires to mark (e.g., using a pencil or a similar item) the real installation points in the installation area in the real-world environment so as to allow for holes to be drilled, nails to be inserted, among other examples.

Figure 1F:
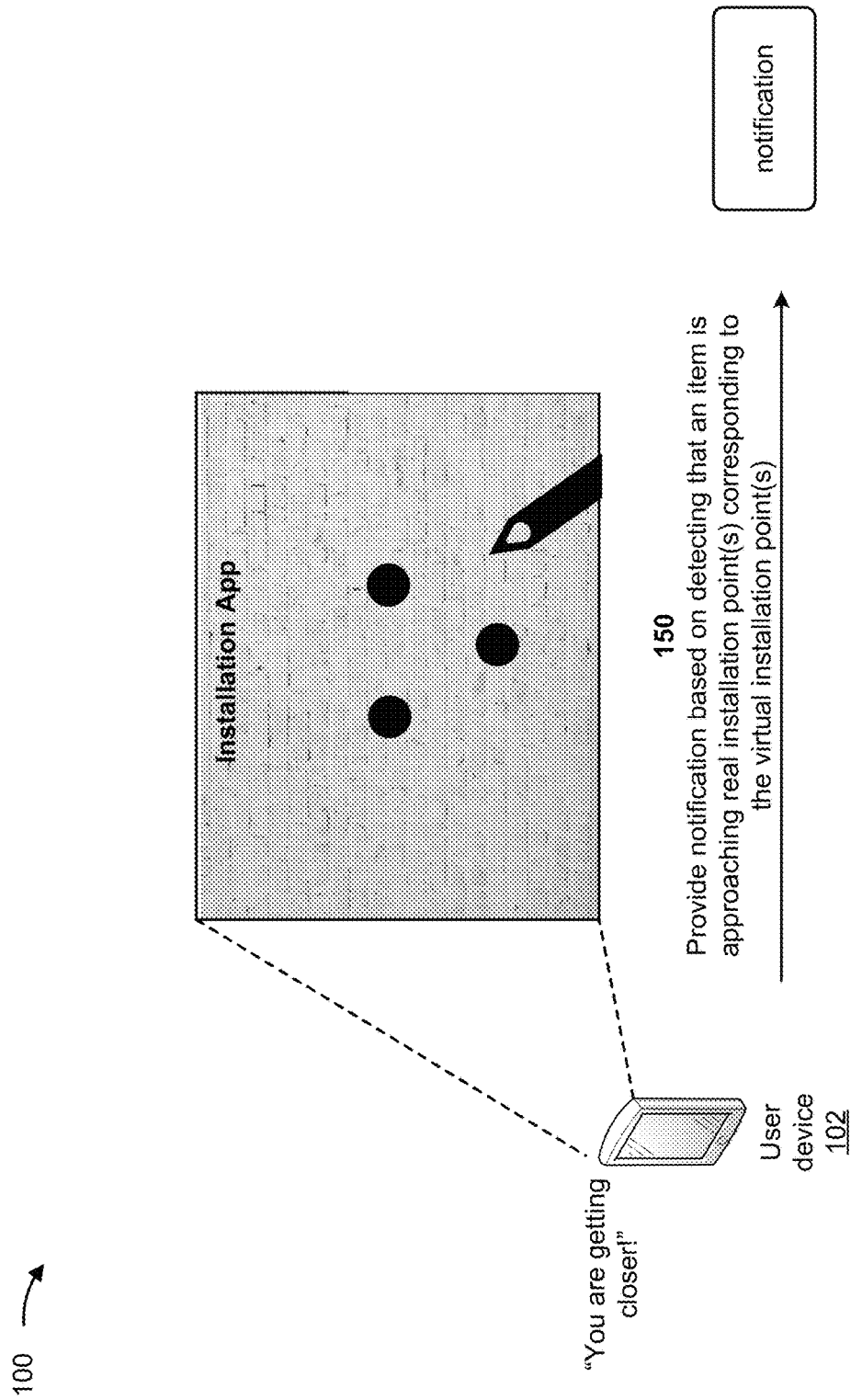

As shown in FIG. 1F, and by reference number 150, the user device 102 may provide notification based on detecting that an item approaching real installation point(s) corresponding to the virtual installation point(s). For example, assume that the camera of the user device 102 is directed toward the installation location and that the display is displaying the AR representations of the virtual installation points. Further assume that the user is starting the process of marking the real installation points, in the real-world environment, using the pencil. The user and the user device 102 may move towards the installation location to enable the user to mark the real installation points. Alternatively, the user device 102 may remain stationary while the user moves towards the installation location to mark the real installation points. Further assume that the display displays an item (e.g., the pencil) approaching the AR representations of the virtual installation points.

In this regard, the equipment installation application may detect that the item is approaching the real installation points based on the display indicating that the item is approaching the virtual installation points displayed on the display. In some implementations, the equipment installation application may first detect the item when the item is within a threshold distance of the real installation points and, based on detecting the item, may monitor a movement of the item to detect that the item is approaching the real installation points. In some examples, the threshold distance may be defined by the user. Additionally, or alternatively, the equipment installation application may be pre-configured with information identifying the threshold distance.

In some implementations, as a result of monitoring the movement of the item, the equipment installation application may determine a distance between the item and the real installation points based on image data associated with the display displaying the item and the virtual installation points. The equipment installation application may determine the distance between the item and the real installation points using one or more image processing techniques. The one or more image processing techniques may be used to determine a correlation between a distance between the item and the virtual installation points (displayed on the display) and the distance between the item and the real installation points. In some examples, the equipment installation application may determine the distance between the item and the real installation points based the distance between the item and the virtual installation points (displayed on the display) and a scale associated with rendering information, in the real-environment, on the display (e.g., the scale for displaying the AR information on the display of the user device 102 described above).

In some implementations, the equipment installation application may provide a notification based on the distance between the item and the real installation points. In some examples, the equipment installation application may use the one or more computer vision techniques to process a depiction of the installation area displayed on the display. For instance, the device may process the depiction of the installation area (on the display of the device) using an image classification technique (e.g., a CNNs technique, a ResNet technique, and/or a VGG technique) and/or an object detection technique (e.g. a SSD technique, a YOLO technique, and/or a R-FCN technique). Based on processing the depiction of the installation area, the device may detect the item in the installation area and detect the real installation points (e.g., further based on the input identifying the installation location which corresponds to the real installation points). In some examples, based on the one or more computer vision techniques, the equipment installation application may determine coordinates of the user device 102 (e.g., 3D coordinates of the item with respect to the user device 102) and coordinates of the real installation points (e.g., 3D coordinates of the real installation point with respect to the user device 102). The equipment installation application may determine the distance between the item and the real installation points based on a difference between the coordinates of the user device 102 and the coordinates of the real installation points.

In some examples, when providing the notification, the equipment installation application may provide a visual notification (e.g., using a flash associated with the camera, using a light associated with the user device 102, among other examples) and/or provide an audible notification (e.g., using a speaker associated with the user device 102).

In some implementations, as the equipment installation application detects that the distance (between the item and the real installation points) decreases, the equipment installation application may cause a rate of the notification to increase. For example, the equipment installation application may use the one or more computer vision techniques to monitor movement of the item (e.g., in the installation area). For instance, the equipment installation application may monitor the item to detect a change in the coordinates of the item. Based on monitoring the movement of the item (e.g., based on detecting the change in the coordinates of the item), the equipment installation application may determine the distance between the item and the real installation points. In some instances, the equipment installation application may determine that the distance between the item and the real installation points is decreasing (e.g., determine that the item is approaching the real installation points). For example, as the item approaches the real installation points, the equipment installation application may cause an audible noise to ping at an increasing rate (e.g., a faster rate) and/or may cause the flash and/or the light to flash at an increasing rate (e.g., a faster rate). Additionally, or alternatively, the equipment installation application may cause the user device 102 to vibrate at an increasing rate and/or at an increasing magnitude. In some examples, as shown in FIG. 1F, the equipment installation application may cause the speaker to provide vocal feedback to the user via the speaker of the user device 102. The vocal feedback may be related to the distance between the item to the real installation points.

In some implementations, a type of the notification and/or a rate of the notification provided may be configured by the user using the user device 102 (e.g., via an interface associated with the equipment installation application). Additionally, or alternatively, the equipment installation application may be pre-configured with the type of the notification and/or the rate of the notification.

As shown in FIG. 1G, and by reference number 155, the user device 102 may provide notification based on detecting the item at the real installation point(s). For example, assume that the user is marking a particular real installation point of the real installation points, in the real-world environment, using the pencil. In this regard, the display may depict the AR representation (of a virtual installation point associated with the particular real installation point) overlaying the marking. The equipment installation application may determine that the item is located at the particular real installation point, in a manner similar to the manner described above.

In some implementations, based on detecting that the item is located at the particular real installation point, the equipment installation application may cause the audible ping to become constant and/or may cause the flash and/or the light to remain on (e.g., to simulate a flashlight). In some examples, as shown in FIG. 1G, the equipment installation application may cause the speaker to provide vocal feedback to the user via the speaker of the user device 102. The vocal feedback may be related to the distance between the item and the particular real installation point. The equipment installation application may perform similar actions as the user marks one or more real installation points in the installation location of the installation area.

In some implementations, the equipment installation application may instruct the user to confirm that the markings of the real installation points (at the installation location in the real-world environment) match the AR representations of the virtual installation points. For example, the equipment installation application may instruct the user to direct the camera of the user device 102 toward to the installation location to cause the display to display the installation location. In this regard, the AR representations of the virtual installation points may be displayed on the display. The user may adjust the orientation and/or the position of the user device 102 (e.g., of the camera) in an attempt to match the markings of the real installation points (in the real-world environment) with the AR representations of the virtual installation points. In some implementations, the equipment installation application may determine the orientation and/or the position of the user device 102 based on data from the gyroscope of the user device 102 and/or based on data from the accelerometer of the user device 102. In some examples, the equipment installation application may instruct the user to adjust the orientation and/or the position of the user device 102 in a manner similar to the manner described above. For example, user may adjust the orientation and/or the position of the camera to cause the AR representations of the virtual installation points to be are overlaid over corresponding ones of the real installation points.

In some implementations, the equipment installation application may analyze image data (e.g., associated with the display displaying the AR representations and the markings of the real installation points) to determine a match between an AR location and/or an AR position of the AR representations (of the virtual installation points) and a real location and/or a real position of the markings of the real installation points. In some examples, the equipment installation application may compare the AR location and/or the AR position and the real location and/or the real position to determine whether the AR location and/or the AR position satisfy a threshold degree of similarity (e.g., match within X %) with respect to the real location and/or the real position. The threshold degree of similarity may be determined by the user and/or pre-configured with the equipment installation application. If the equipment installation application determines that the AR location and/or the AR position do not satisfy the threshold degree of similarity with respect to the real location and/or the real position, the equipment installation application may instruct the user to reperform the markings of the real installation points in the real-world environment.

Figure 1H:
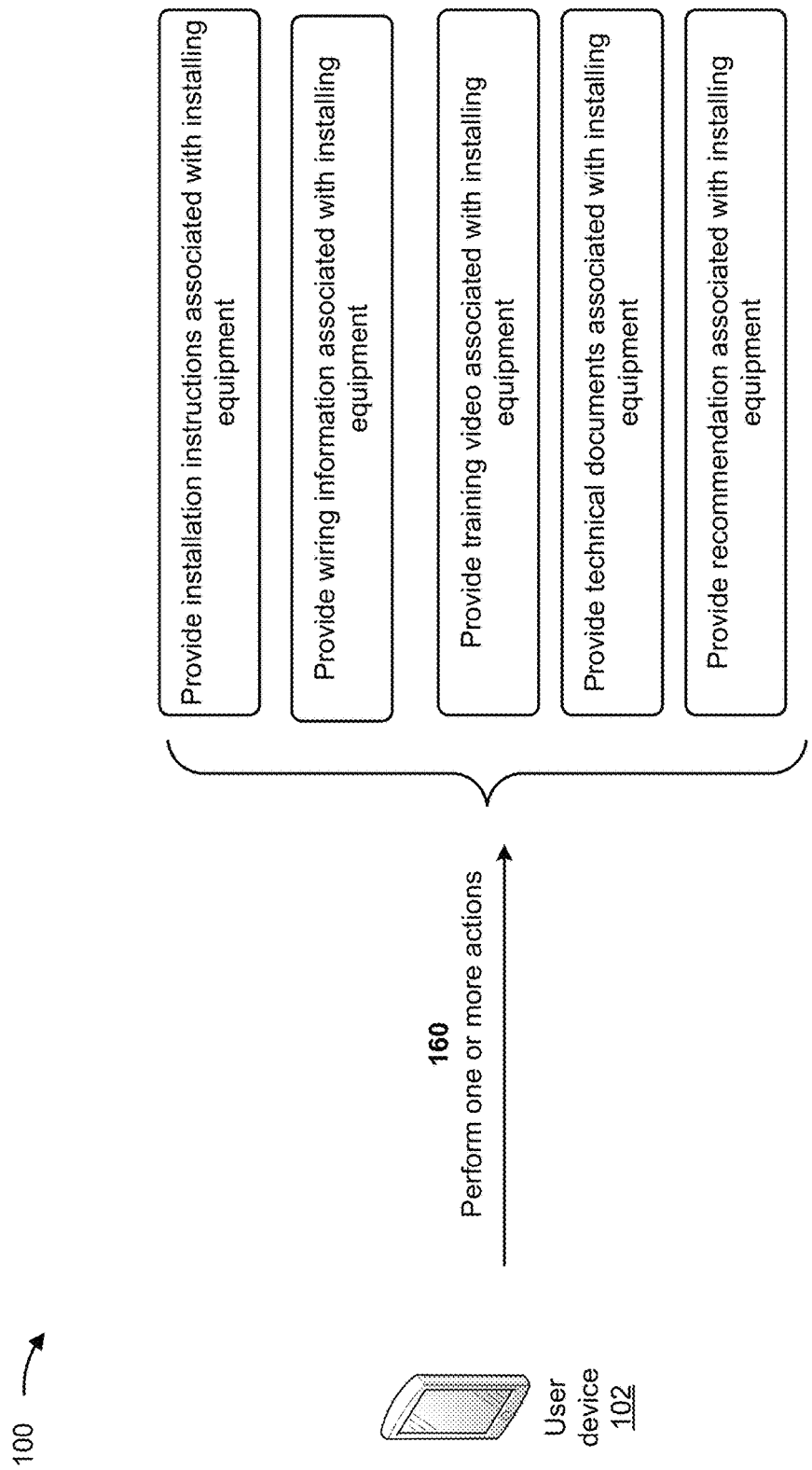

As shown in FIG. 1H, and by reference number 160, the user device 102 may perform one or more actions. For example, assume that the equipment installation application determines that the AR location and/or the AR position satisfy the threshold degree of similarity with respect to the real location and/or the real position. The equipment installation application may cause the user device 102 to perform one or more actions. In some implementations, the one or more actions may include providing installation instructions associated with installing the equipment. In some examples, the equipment installation application may detect selection of the option to present the installation instructions associated with installing the equipment. Based on detecting the selection of the option, the user device 102 may cause the user device 102 to display the installation instructions (e.g., step-by-step instructions for installing the equipment). In some examples, the equipment installation application may provide an instruction based on the user requesting the instruction via the user device 102. In some examples, the equipment installation application may cause the user device 102 (e.g., using the AR feature of the user device 102) to overlay the installation instructions on the display. In some implementations, the installation instructions may be provided with the AR representations of the virtual installation points.

In some implementations, the one or more actions may include providing wiring information associated with installing the equipment. In some examples, the equipment installation application may detect selection of the option to present the wiring information. Based on detecting the selection of the option, the user device 102 may cause the user device 102 to display the wiring information (e.g., wiring schematics associated with wiring the equipment). In some examples, the equipment installation application may cause the user device 102 (e.g., using the AR feature of the user device 102) to overlay the wiring information on the display to facilitate any wiring associated with installing the equipment. In some implementations, the wiring information may be provided with the AR representations of the virtual installation points.

In some implementations, the one or more actions may include providing a training video associated with installing the equipment. In some examples, the equipment installation application may detect selection of the option to present the training video. Based on detecting the selection of the option, the user device 102 may cause the user device 102 to display the training video. In some examples, the equipment installation application may cause the user device 102 (e.g., using the AR feature of the user device 102) to overlay the training video on the display. In some implementations, the training video may be provided with the AR representations of the virtual installation points.

In some implementations, the one or more actions may include providing technical documents associated with installing the equipment. In some examples, the equipment installation application may detect selection of the option to present the technical documents associated with installing the equipment. Based on detecting the selection of the option, the user device 102 may cause the user device 102 to display the technical documents. The technical documents may include technical documents associated with the equipment (e.g., specification, configuration, and/or technical information regarding the equipment), technical documents regarding different techniques for installing the equipment, among other examples. In some examples, the equipment installation application may cause the user device 102 (e.g., using the AR feature of the user device 102) to overlay the technical documents on the display. In some implementations, the installation instructions may be provided with the AR representations of the virtual installation points.

In some implementations, the one or more actions may include providing installation recommendations associated with installing the equipment. In some examples, the equipment installation application may detect selection of the option to present the installation recommendations. Based on detecting the selection of the option, the user device 102 may cause the user device 102 to display the installation recommendations. In some examples, the equipment installation application may cause the user device 102 (e.g., using the AR feature of the user device 102) to overlay the installation recommendations on the display. The recommendations may include recommendations regarding tools, recommendations regarding personal protective equipment, among other examples. With respect to the installation points in the example herein, the recommendations may also include information identifying a drilling tool, a drill bit, a size of a drill bit, a type of drill bit, among other examples. In some implementations, the installation recommendations may be provided with the AR representations of the virtual installation points.

While the present disclosure has been described with respect to drilling holes, the present disclosure is applicable to creating other types of openings in an installation location such creating an opening in a wall, creating an opening in drywall (e.g., cutting drywall), among other examples.

In some implementations, the equipment installation application may cause the user device 102 to provide the installation information and the installation location information to an autonomous device that performs installations of equipment. Providing the installation information and the installation location information to the autonomous device may cause the autonomous device to perform a portion or an entirety of the installation of the equipment at the installation location.

In some implementations, the user device 102 may perform the one or more actions in a particular order (e.g., alternatively to performing the one or more actions based on detecting the selection of the options, as described above). For example, the equipment installation application may analyze historical data regarding an order of the options selected (e.g., historical options selected by the user device 102, an order of selection of the historical options, among other examples) and may determine the particular order for performing the one or more actions based on the historical data.

By displaying the augmented reality representation of the virtual installation point and providing the notification, the equipment installation application may enable the device to preserve computing resources, network resources, and other resources that would have otherwise been used to repair damaged equipment, restore interrupted network service, perform troubleshooting for improper installations, provide technical support for improper installations, among other examples.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
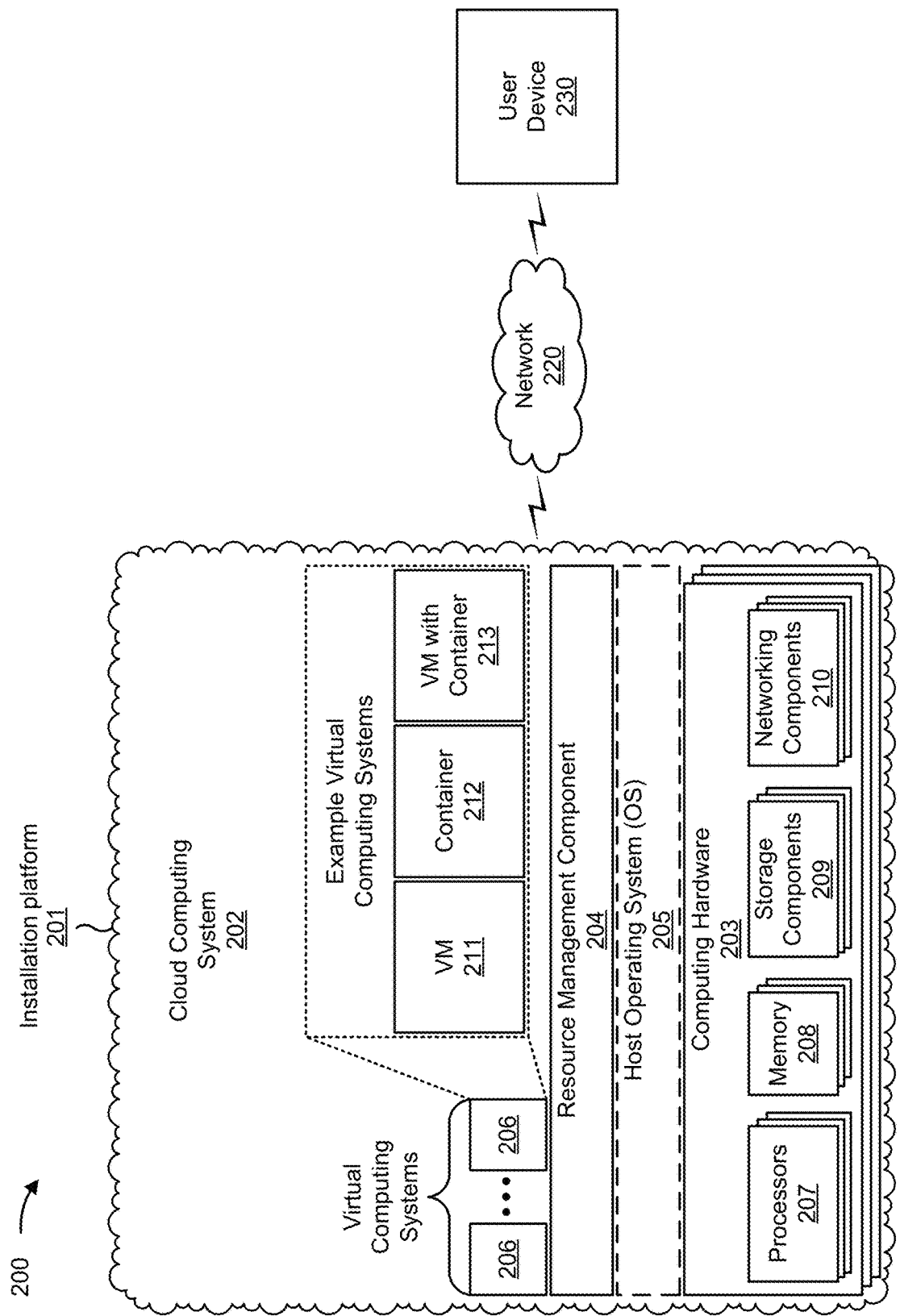
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a installation platform 201 (which may correspond to the installation platform 110 described above), which may include one or more elements of and/or may execute within a cloud computing system 202. The cloud computing system 202 may include one or more elements 203-213, as described in more detail below. As further shown in FIG. 2, environment 200 may include a network 220 and/or a user device 230 (which may correspond to the user device 102 described above). Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the installation platform 201 may include one or more elements 203-213 of the cloud computing system 202, may execute within the cloud computing system 202, and/or may be hosted within the cloud computing system 202, in some implementations, the installation platform 201 may not be cloud-based (e.g., may be implemented outside of a cloud computing system) or may be partially cloud-based. For example, the installation platform 201 may include one or more devices that are not part of the cloud computing system 202, such as device 300 of FIG. 3, which may include a standalone server or another type of computing device. The installation platform 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The user device 230 may include one or more devices capable of communicating with the installation platform 201 and/or a network (e.g., network 220). For example, the user device 230 may include a wireless communication device, an IoT device, a radiotelephone, a personal communications system (PCS) terminal (e.g., that may combine a cellular radiotelephone with data processing and data communications capabilities), a smart phone, a laptop computer, a tablet computer, a smart device (e.g., smart glasses or a smart watch), a personal gaming system, and/or a similar device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
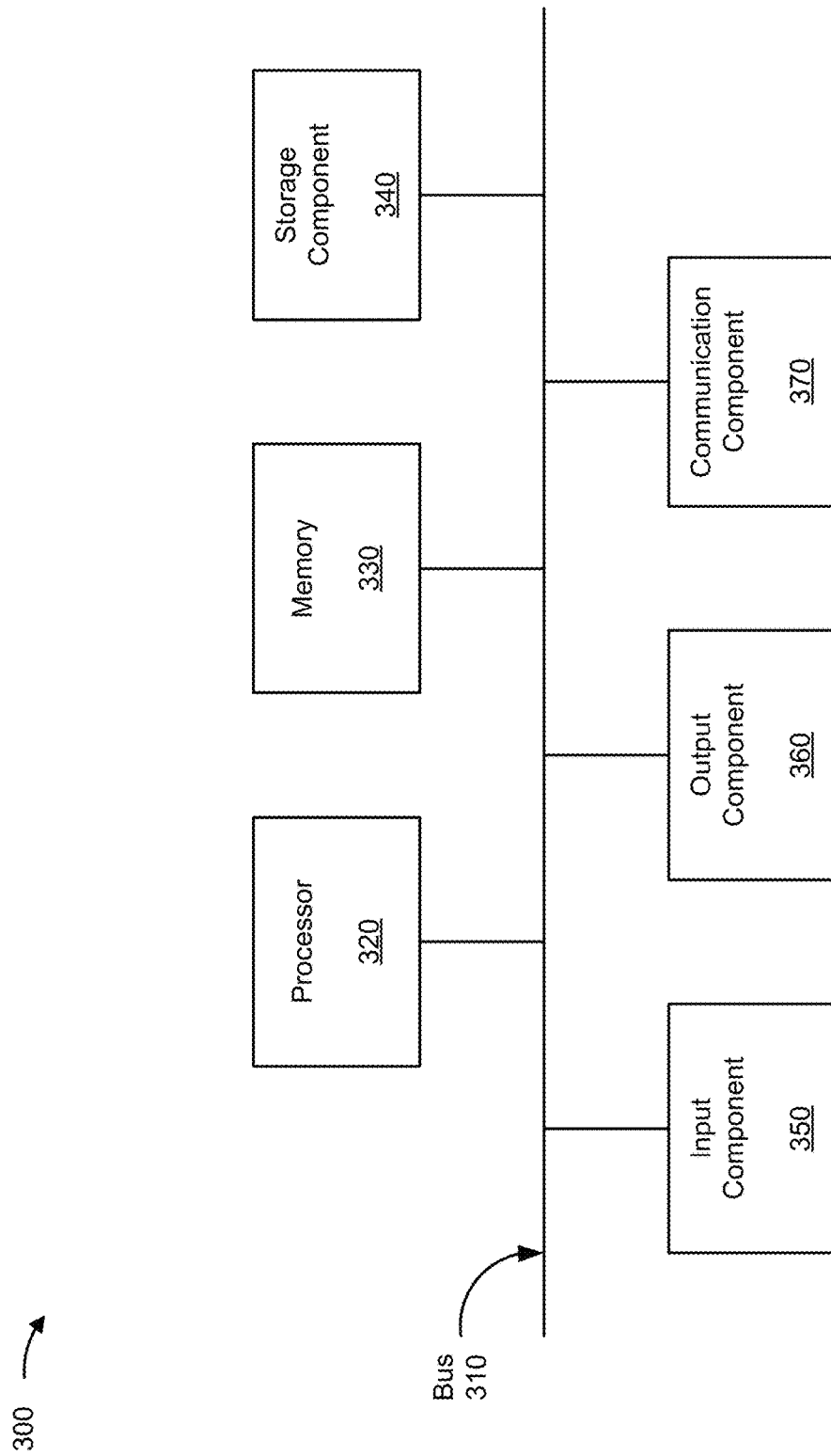
FIG. 3 is a diagram of example components of one or more devices of FIG. 2.

FIG. 3 is a diagram of example components of a device 300, which may correspond to the installation platform 201 and/or the user device 230. In some implementations, the installation platform 201 and/or the user device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
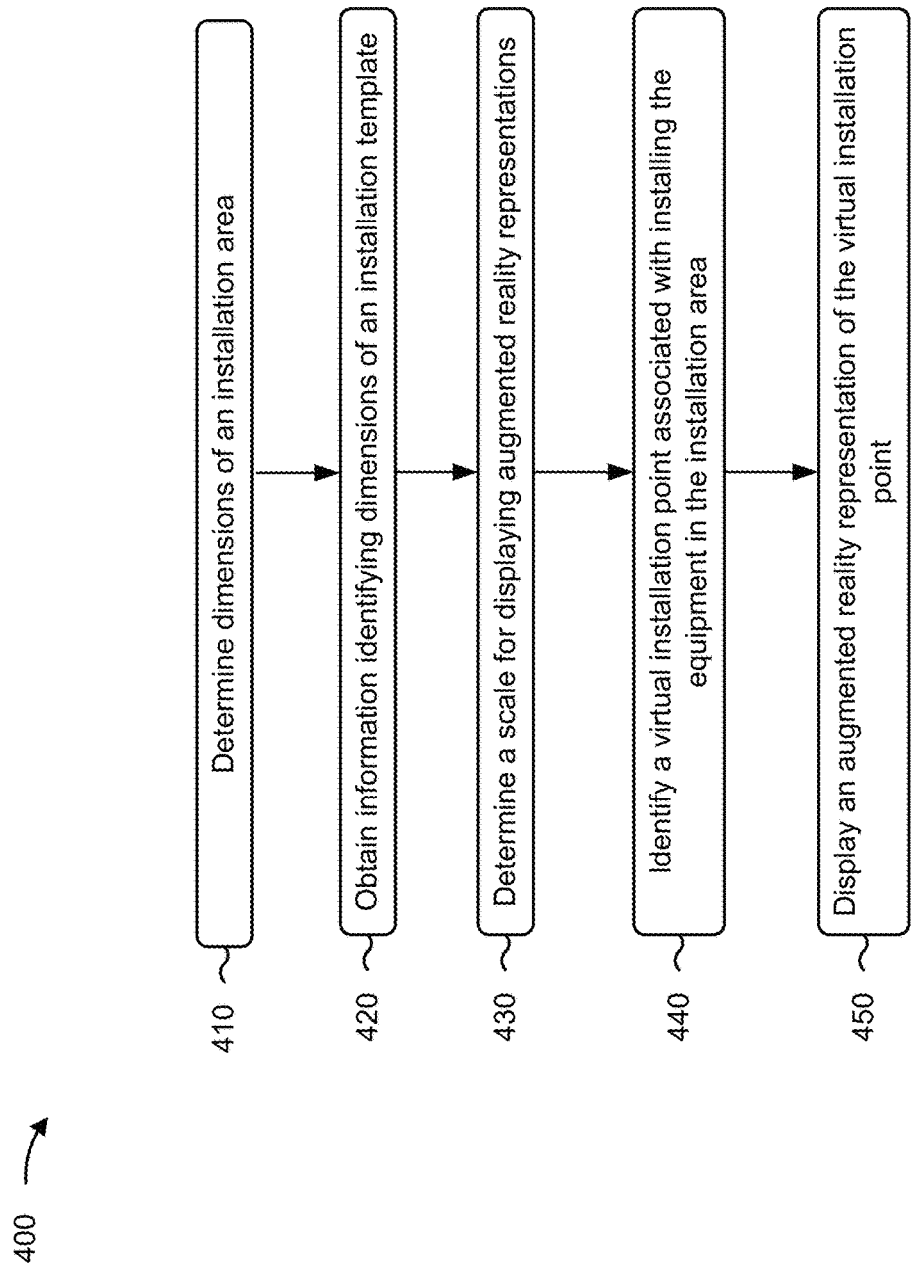
FIG. 4 is a flowchart of an example process associated with installing an item using augmented reality.

FIG. 4 is a flowchart of an example process 400 associated with installing an item using augmented reality. In some implementations, one or more process blocks of FIG. 4 may be performed by a user device (e.g., the user device 102 or the user device 230). In some implementations, one or more process blocks of FIG. 4 may be performed by another device or a group of devices separate from or including the user device, such as the user device (e.g., the user device 102 or the user device 230) and/or the installation platform (e.g., the installation platform 110 or the installation platform 201). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining dimensions of an installation area in a real-world environment based on data from one or more sensor devices of the user device (block 410). For example, the user device may determine dimensions of an installation area in a real-world environment based on data from one or more sensor devices of the user device, as described above.

In some implementations, the one or more sensor devices may include one or more time-of-flight (ToF) sensor devices and one or more Light Detection and Ranging (LIDAR) devices. The data may comprise one or more of ToF data from the one or more ToF sensor devices; or LIDAR data from the one or more LIDAR devices.

As further shown in FIG. 4, process 400 may include obtaining information identifying dimensions of an installation template associated with installing an equipment in the real-world environment (block 420). For example, the user device may obtain information identifying dimensions of an installation template associated with installing an equipment in the real-world environment, as described above.

As further shown in FIG. 4, process 400 may include determining a scale for displaying augmented reality representations associated with installing the equipment, based on the dimensions of the installation area and the dimensions of the installation template (block 430). For example, the user device may determine a scale for displaying augmented reality representations associated with installing the equipment, based on the dimensions of the installation area and the dimensions of the installation template, as described above.

As further shown in FIG. 4, process 400 may include identifying a virtual installation point associated with installing the equipment in the installation area in the real-world environment (block 440). For example, the user device may identify a virtual installation point associated with installing the equipment in the installation area in the real-world environment, wherein the virtual installation point is not visible in the real-world environment, and wherein the virtual installation point is identified based on information identifying an installation point of the installation template, as described above. In some implementations, the virtual installation point is not visible in the real-world environment. In some implementations, the virtual installation point is identified based on information identifying an installation point of the installation template.

In some implementations, displaying the augmented reality representation of the virtual installation point comprises receiving input identifying an installation location in the installation area in the real-world environment, and displaying the augmented reality representation of the virtual installation point, on a display of the user device, at a virtual installation location corresponding to the installation location based on the input.

In some implementations, process 400 includes receiving a request to display installation information associated with installing the equipment, and displaying the installation information in association with the augmented reality representation.

In some implementations, the installation information includes at least one of installation instructions associated with installing the equipment, training videos associated with installing the equipment, wiring schematics associated with installing the equipment, or technical documents associated with installing the equipment.

In some implementations, the equipment includes a first equipment and the installation information includes first installation information. In some implementations, process includes receiving second installation information for installing a second equipment; and transmitting the second installation information to the server device for storage in a memory associated with the server device.

As further shown in FIG. 4, process 400 may include displaying an augmented reality representation of the virtual installation point to enable a depiction of a corresponding real installation point in the installation area in the real-world environment (block 450). For example, the user device may display an augmented reality representation of the virtual installation point to enable a depiction of a corresponding real installation point in the installation area in the real-world environment, wherein the augmented reality representation is displayed based on the scale and a distance from the user device to the installation area, as described above. In some implementations, the augmented reality representation is displayed based on the scale and a distance from the user device to the installation area.

Process 400 may include detecting that an item in the real-world environment is approaching the corresponding real installation point; and selectively providing a notification according to a first rate or according to a second rate, different than the first rate, based on a distance between the item in the real-world environment and the corresponding real installation point.

In some implementations, selectively providing the notification comprises at least one of providing a visual notification, or providing an audible notification.

In some implementations, the notification is provided according to the first rate when the distance, between the item and the corresponding real installation point, is a first distance, wherein the notification is provided according to the second rate when the distance, between the item and the corresponding real installation point, is a second distance, wherein the second rate is greater than the first rate, and wherein the first distance is greater than the second distance.

In some implementations, providing the notification comprises causing flash, associated with a camera of the device, to be successively activated and deactivated according to the rate to facilitate identification of the corresponding real installation point in the real-world environment; causing a light, associated with the device, to successively turn on and turn off according to the rate to facilitate identification of the corresponding real installation point in the real-world environment; or causing speaker of the device to emit the audible notification according to the rate to facilitate identification of the corresponding real installation point in the real-world environment.

In some implementations, process 400 includes transmitting, to a server device, a request to obtain installation information associated with identifying the virtual installation point, wherein the request includes the equipment information, and receiving, from the server device, the installation information based on transmitting the request.

In some implementations, the virtual installation point is a first virtual installation point, the installation point of the installation template is a first installation point, and the augmented reality representation is a first augmented reality representation. In some implementations, process 400 includes identifying a second virtual installation point, associated with installing the equipment in the installation area, based on information identifying a second installation point of the installation template; and displaying a second augmented reality representation of the second virtual installation point with the first augmented reality representation. The first augmented reality representation and the second augmented reality representation may be displayed based on the scale and based on information identifying a configuration of the first installation point and the second installation point in the installation template.

In some implementations, process 400 includes detecting a change in the distance based on second data from the one or more sensor devices; and adjusting a size of the augmented reality representation displayed by the user device based on the scale and the detected change in the distance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining, by a user device, dimensions of an installation area in a real-world environment based on data from one or more sensor devices of the user device;
    obtaining, by the user device, information identifying dimensions of an installation template associated with installing an equipment in the real-world environment;
    determining, by the user device, a scale for displaying augmented reality representations associated with installing the equipment, based on the dimensions of the installation area and the dimensions of the installation template;
    identifying, by the user device, a virtual installation point associated with installing the equipment in the installation area in the real-world environment,
        wherein the virtual installation point is not visible in the real-world environment, and
        wherein the virtual installation point is identified based on information identifying an installation point of the installation template; and
    displaying, by the user device, an augmented reality representation of the virtual installation point to enable a depiction of a corresponding real installation point in the installation area in the real-world environment,
        wherein the augmented reality representation is displayed based on the scale and a distance from the user device to the installation area.

2. The method of claim 1, wherein the one or more sensor devices include one or more time-of-flight (ToF) sensor devices and one or more Light Detection and Ranging (LIDAR) devices; and
    wherein the data comprises one or more of:
        ToF data from the one or more ToF sensor devices; or
        LIDAR data from the one or more LIDAR devices.

3. The method of claim 1, wherein the virtual installation point is a first virtual installation point, the installation point of the installation template is a first installation point, and the augmented reality representation is a first augmented reality representation; and
    wherein the method further comprises:
        identifying a second virtual installation point, associated with installing the equipment in the installation area, based on information identifying a second installation point of the installation template; and
        displaying a second augmented reality representation of the second virtual installation point with the first augmented reality representation,
            wherein the first augmented reality representation and the second augmented reality representation are displayed based on the scale and based on information identifying a configuration of the first installation point and the second installation point in the installation template.

4. The method of claim 1, further comprising:
obtaining equipment information identifying the equipment by:
obtaining an image of the equipment,
obtaining an image of a packaging of the equipment,
scanning a code provided on the equipment,
scanning a code provided on the packaging, or
receiving input identifying the equipment; and
wherein identifying the virtual installation point comprises identifying the virtual installation point based on the equipment information.

5. The method of claim 1, wherein the data is first data; and
wherein the method further comprises:
detecting a change in the distance based on second data from the one or more sensor devices; and
adjusting a size of the augmented reality representation displayed by the user device based on the scale and the detected change in the distance.

6. The method of claim 1, wherein the data is first data; and
wherein the method further comprises:
identifying one or more objects or one or more planes in the installation area;
detecting a change of at least one of a position or an orientation of the user device based on second data from the one or more sensor devices; and
after detecting the change of the at least one of the position or the orientation of the user device, causing the augmented reality representation to remain at the virtual installation point based on the one or more objects or the one or more planes in the installation area.

7. The method of claim 1, further comprising:
displaying installation information in association with the augmented reality representation,
wherein the installation information includes at least one of:
installation instructions associated with installing the equipment,
training videos associated with installing the equipment,
wiring schematics associated with installing the equipment, or
technical documents associated with installing the equipment.

8. The method of claim 1, further comprising:
detecting that an item in the real-world environment is approaching the corresponding real installation point; and
selectively providing a notification according to a first frequency or according to a second frequency, different than the first frequency, based on a distance between the item in the real-world environment and the corresponding real installation point;
wherein the notification is provided according to a first rate when the distance, between the item and the corresponding real installation point, is a first distance,
wherein the notification is provided according to a second rate when the distance, between the item and the corresponding real installation point, is a second distance,
wherein the second rate is greater than the first rate, and
wherein the first distance is greater than the second distance.

9. A device, comprising:
one or more processors configured to:
determine dimensions of an installation area in a real-world environment based on data from one or more sensor devices of the device;
obtain information identifying dimensions of an installation template associated with installing an equipment in the real-world environment;
determine a scale for displaying augmented reality representations associated with installing the equipment, based on the dimensions of the installation area and the dimensions of the installation template;
identify a virtual installation point associated with installing the equipment in the installation area in the real-world environment,
wherein the virtual installation point is identified based on information identifying an installation point of the installation template; and
display an augmented reality representation of the virtual installation point to enable a depiction of a corresponding real installation point in the installation area in the real-world environment,
wherein the augmented reality representation is displayed based on the scale.

10. The device of claim 9, wherein the one or more processors are further configured to:
provide a notification according to a rate that is based on a distance between an item in the real-world environment and the corresponding real installation point;
wherein the notification includes at least one of a visual notification or an audible notification;
wherein the rate of the notification increases as the distance, between the item and the corresponding real installation point, decreases; and
wherein the one or more processors, when providing the notification, are configured to at least one of:
cause a flash, associated with a camera of the device, to be successively activated and deactivated according to the rate to facilitate identification of the corresponding real installation point in the real-world environment;
cause a light, associated with the device, to successively turn on and turn off according to the rate to facilitate identification of the corresponding real installation point in the real-world environment; or
cause a speaker of the device to emit the audible notification according to the rate to facilitate identification of the corresponding real installation point in the real-world environment.

11. The device of claim 9, wherein the augmented reality representation is displayed based on the scale and a distance from the device to the installation area;
wherein the data is first data; and
wherein the one or more processors are configured to:
detect a change in the distance based on second data from the one or more sensor devices; and
adjust a size of the augmented reality representation displayed by the device based on the scale and the detected change in the distance.

12. The device of claim 9, wherein the one or more processors are further configured to:
receive installation information associated with installing the equipment;
receive a request to display the installation information associated with installing the equipment; and
display the installation information in association with the augmented reality representation of the virtual installation point; and wherein the installation information includes at least one of:
  installation instructions associated with installing the equipment,
  training videos associated with installing the equipment,
  wiring schematics associated with installing the equipment, or
  technical documents associated with installing the equipment.

13. The device of claim 12, wherein the equipment is a first equipment and the installation information is first installation information; and
  wherein the one or more processors are configured to:
    receive second installation information for installing a second equipment; and
    transmit the second installation information for storage in a memory.

14. The device of claim 9, wherein the one or more sensor devices include one or more time-of-flight (ToF) sensor devices and one or more Light Detection and Ranging (LIDAR) devices; and
  wherein the data comprises one or more of:
    ToF data from the one or more ToF sensor devices; or
    LIDAR data from the one or more LIDAR devices.

15. A non-transitory computer-readable medium storing a set of instructions, the set of instructions comprising:
  one or more instructions that, when executed by one or more processors of a device, cause the device to:
    determine a scale for displaying augmented reality representations associated with installing an equipment in an installation area in a real-world environment;
    identify a virtual installation point associated with installing the equipment in the installation area in the real-world environment,
      wherein the virtual installation point is not visible in the real-world environment; and
    display an augmented reality representation of the virtual installation point to enable a depiction of a corresponding real installation point in the installation area in the real-world environment,
      wherein the augmented reality representation is displayed based on the scale and a distance from the device to the installation area.

16. The non-transitory computer-readable medium of claim 15, wherein the one or more instructions further cause the device to:
  receive a request to display installation information associated with installing the equipment; and
  display the installation information in association with the augmented reality representation of the virtual installation point.

17. The non-transitory computer-readable medium of claim 16, wherein the installation information includes at least one of:
  installation instructions associated with installing the equipment,
  training videos associated with installing the equipment,
  wiring schematics associated with installing the equipment, or
  technical documents associated with installing the equipment.

18. The non-transitory computer-readable medium of claim 15, wherein the one or more instructions further cause the device to:
  detect that an item in the real-world environment is approaching the corresponding real installation point; and
  selectively provide a notification, according to a first rate or according to a second rate, based on a distance between the item and the corresponding real installation point,
    wherein the notification is provided according to the first rate when the distance is a first distance,
    wherein the notification is provided according to the second rate when the distance is a second distance, and
    wherein the second rate is different than the first rate.

19. The non-transitory computer-readable medium of claim 18, wherein the notification is a visual notification or an audible notification.

20. The non-transitory computer-readable medium of claim 15, wherein the one or more instructions further cause the device to:
  obtain equipment information identifying the equipment;
  wherein the one or more instructions, that cause the device to obtain the equipment information, cause the device to at least one of:
    obtain an image of the equipment,
    obtain an image of a packaging of the equipment,
    scan a code provided on the equipment,
    scan a code provided on the packaging, or
    receive input identifying the equipment; and
  wherein the one or more instructions, that cause the device to identify the virtual installation point, cause the device to identify the virtual installation point based on the equipment information.

* * * * *